Figure 1:
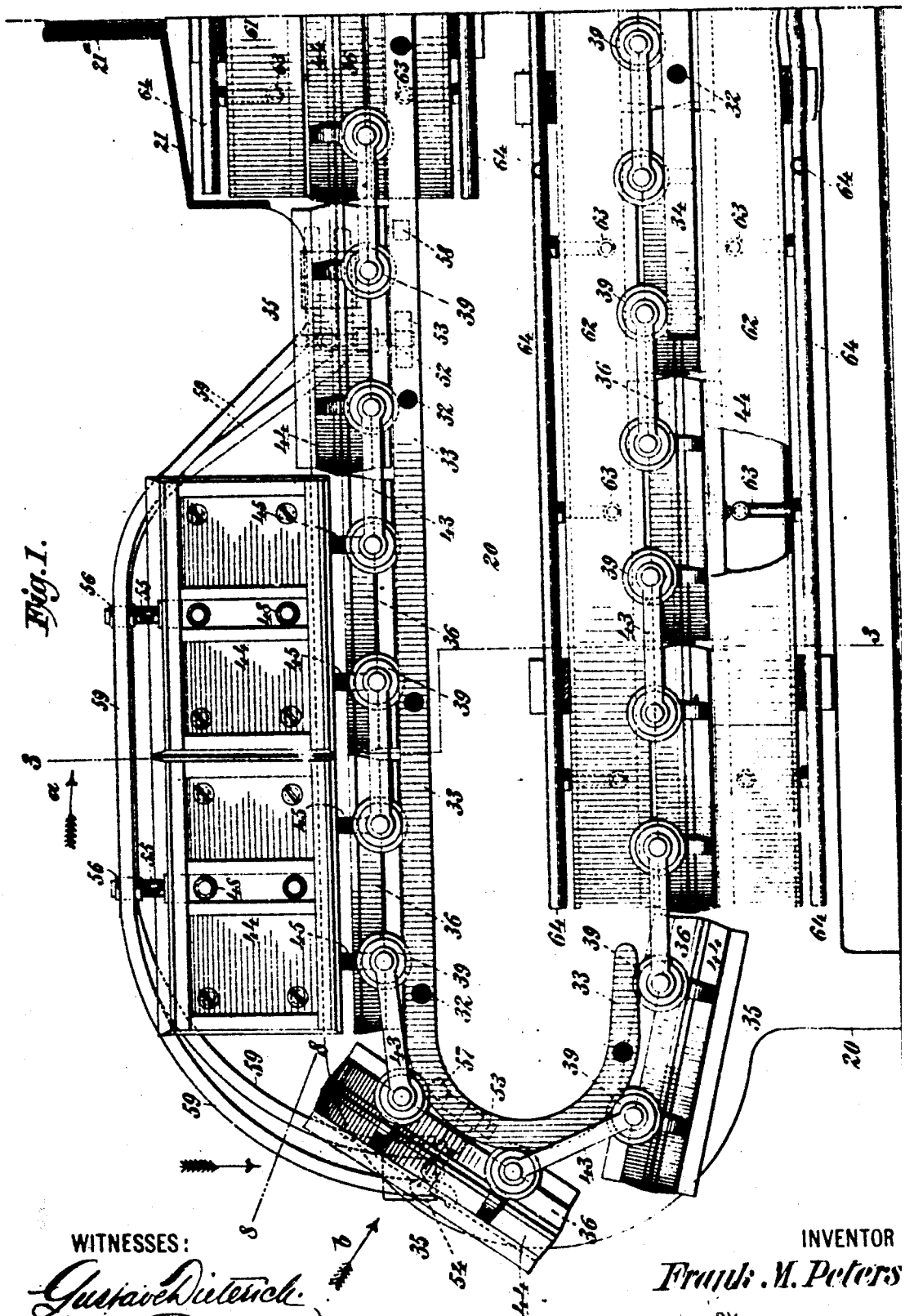

No. 881,824. PATENTED MAR. 10, 1908.
F. M. PETERS.
MACHINE FOR BAKING SUGAR WAFERS.
APPLICATION FILED MAY 22, 1906.

7 SHEETS—SHEET 3.

WITNESSES:
INVENTOR
Frank M. Peters
BY
his ATTORNEY.

No. 881,824. PATENTED MAR. 10, 1908.
F. M. PETERS.
MACHINE FOR BAKING SUGAR WAFERS.
APPLICATION FILED MAY 22, 1906.

7 SHEETS—SHEET 4.

WITNESSES:
Gustav Dieterich
Edwin H. Dieterich

INVENTOR
Frank M. Peters
BY
Conrad August Dieterich
his ATTORNEY

No. 881,824. PATENTED MAR. 10, 1908.
F. M. PETERS.
MACHINE FOR BAKING SUGAR WAFERS.
APPLICATION FILED MAY 22, 1906.
7 SHEETS—SHEET 5.
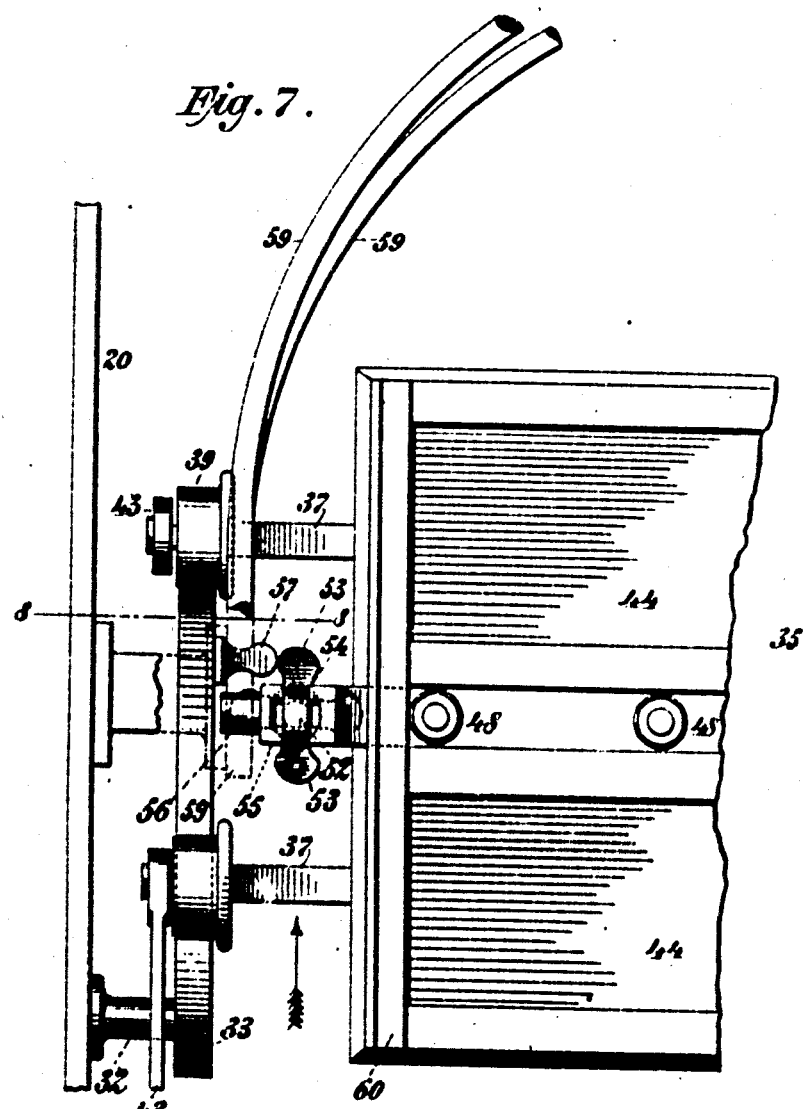
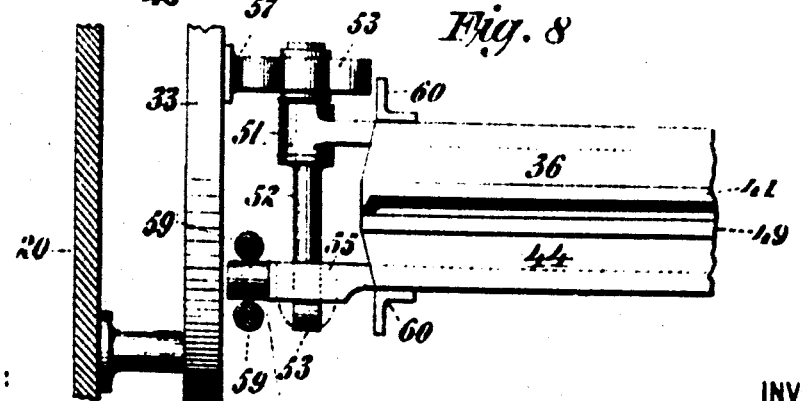
WITNESSES:
INVENTOR
Frank M. Peters
BY
ATTORNEY No. 881,824. PATENTED MAR. 10, 1908.
F. M. PETERS.
MACHINE FOR BAKING SUGAR WAFERS.
APPLICATION FILED MAY 22, 1906.
7 SHEETS—SHEET 6.
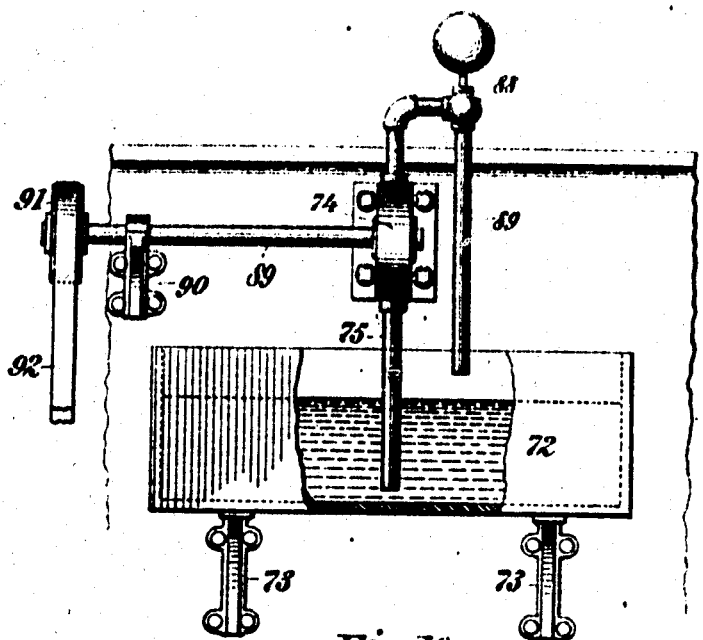
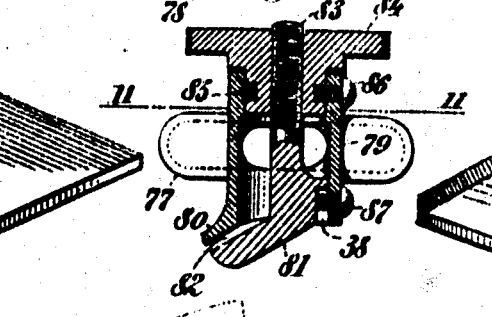
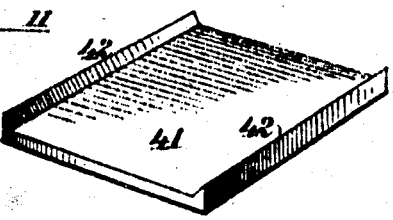
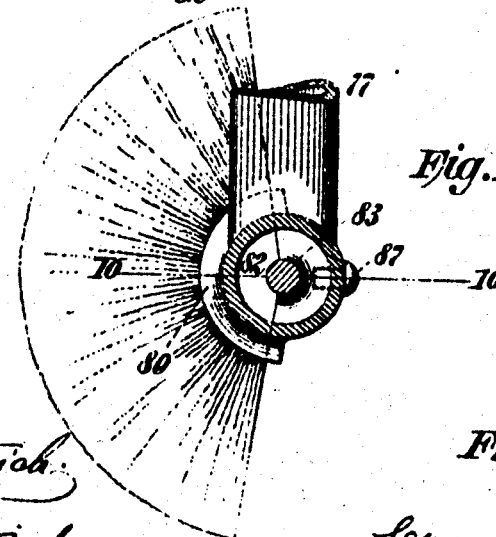
WITNESSES:
Gustave Dieterich
Edwin H. Dieterich
INVENTOR
Frank M. Peters
BY
Conrad Augustus Willard
his ATTORNEY No. 881,824. PATENTED MAR. 10, 1908
F. M. PETERS.
MACHINE FOR BAKING SUGAR WAFERS.
APPLICATION FILED MAY 22, 1906.
7 SHEETS—SHEET 7

WITNESSES:
Gustave Dieterich
Edwin H Dieterich

INVENTOR
Frank M. Peters
BY
Conrad Augustus Dieterich
his ATTORNEY

UNITED STATES PATENT OFFICE.

FRANK M. PETERS, OF CHICAGO, ILLINOIS.

MACHINE FOR BAKING SUGAR-WAFERS.

No. 881,824.

Specification of Letters Patent.

Patented March 10, 1908.

Application filed May 22, 1906. Serial No. 318,116.

*To all whom it may concern:*

Be it known that I, FRANK M. PETERS, a citizen of the United States, residing at Chicago, Cook county, in the State of Illinois, have invented certain new and useful Improvements in Machines for Baking Sugar-Wafers, of which the following is a full, clear, and exact specification.

My invention relates to improvements in baking machinery, and the same has for its object more particularly to provide a simple, efficient and reliable machine for making wafers adapted to be used for sugar wafers, and the said invention has for its object further to provide a machine for continuously and uninterruptedly making said wafers in the form of a strip or band and as soon as the same has been sufficiently baked retain its shape or form to automatically sever said strip or band into sections of the required length, and then complete the baking of said severed sections.

Further said invention has for its object to provide means for preventing the wafer, batter overflowing the edges of the tongs or plates and becoming baked thereon which necessitates subsequent trimming off and entails great waste of material.

Further said invention has for its object to provide means for continuously supplying batter to the lower tong or plate.

Further said invention has for its object to supply the batter to said lower tong or plate in a continuous stream or jet issuing from a nozzle or nozzles so arranged and disposed relative to said tong or plate that it shall constantly cover the tong or plate transversely from edge to edge, and thus avoid the chilling of a portion of the plate, which occurs where the batter is sprayed upon the center thereof and then permitted to spread thereon, and thus render the wafer unequal in quality and structural strength.

To the attainment of these objects and ends my invention consists in the novel details of construction, and in the combination, connection and arrangement of parts hereinafter more fully described, and then pointed out in the claims.

Figure 2:
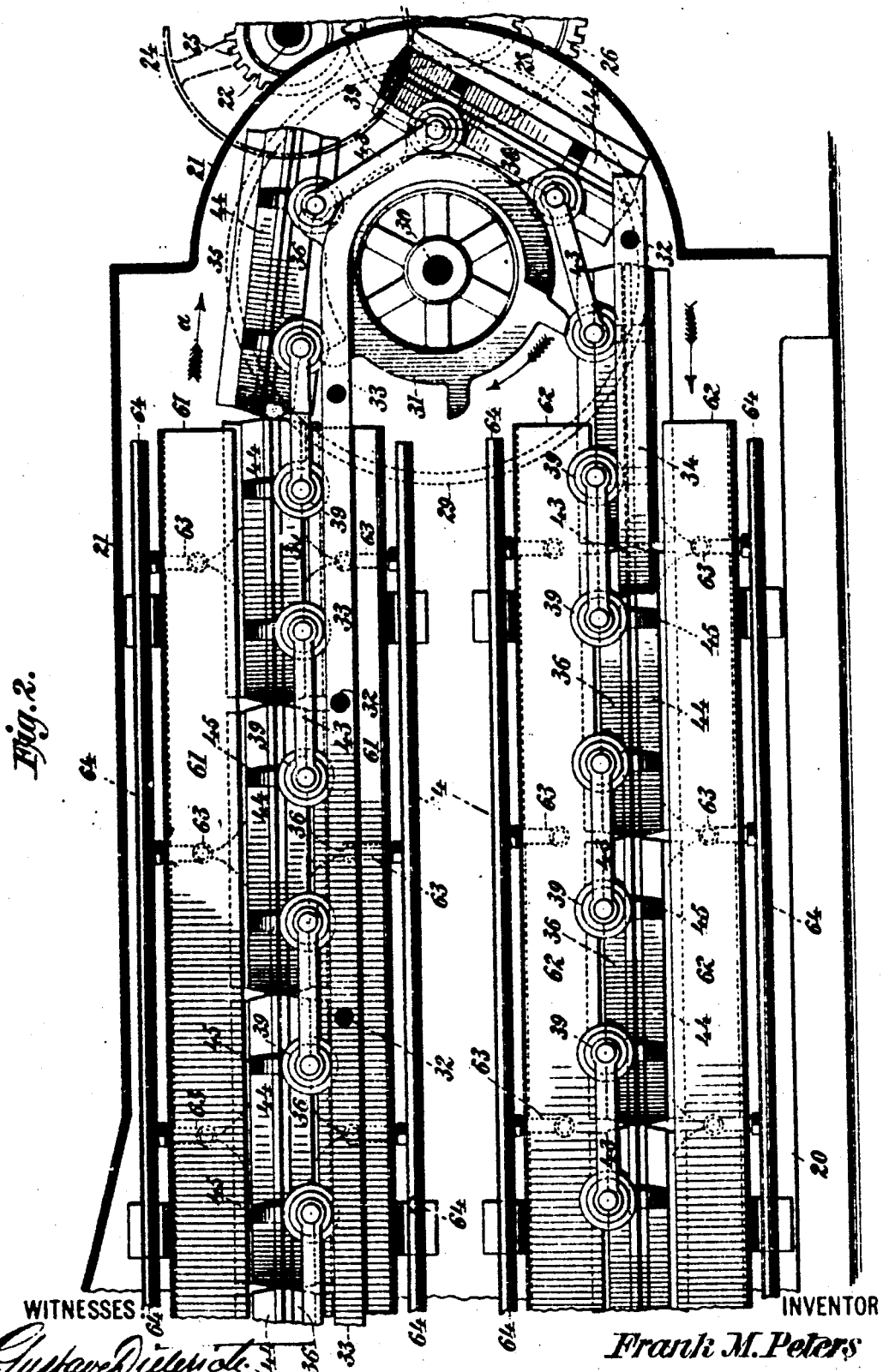
Figure 3:
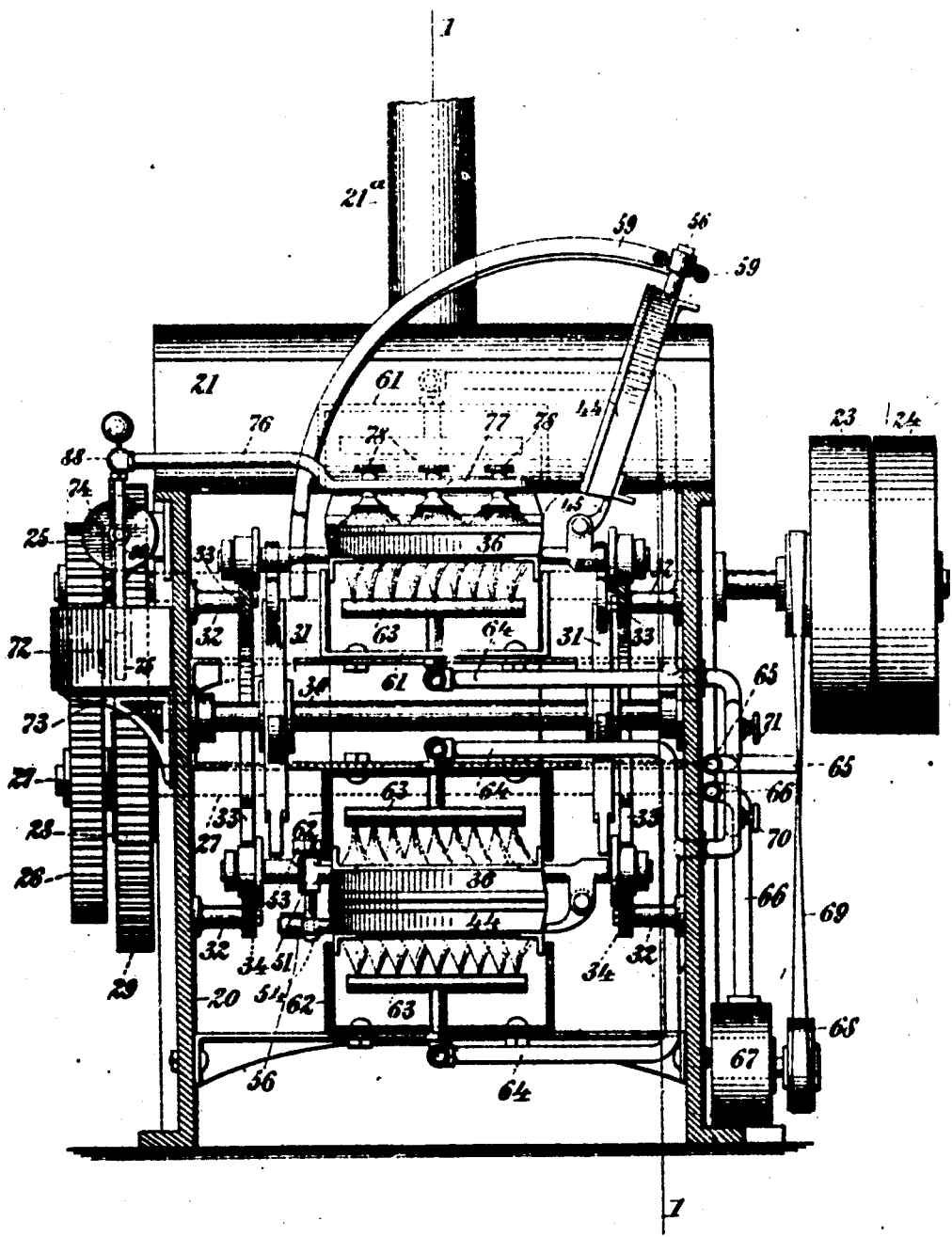
Figure 4:
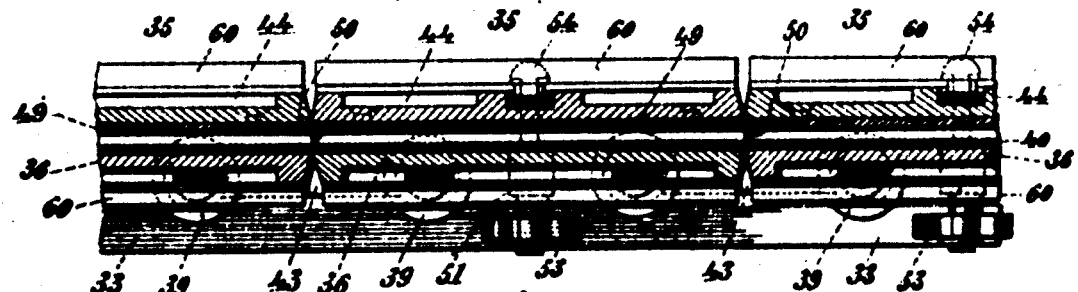
Figure 5:
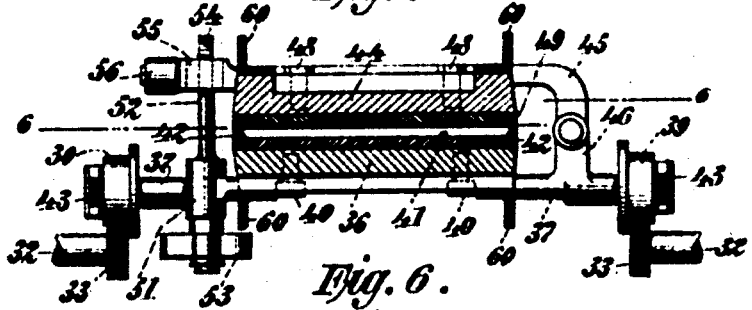
Figure 6:
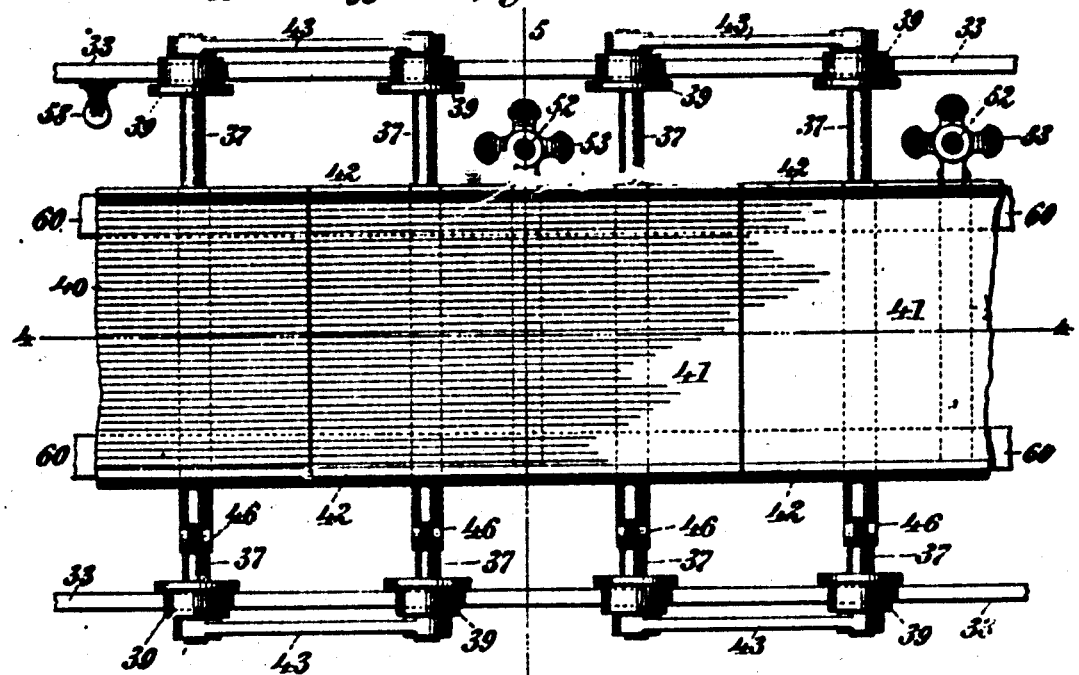
Figure 14:
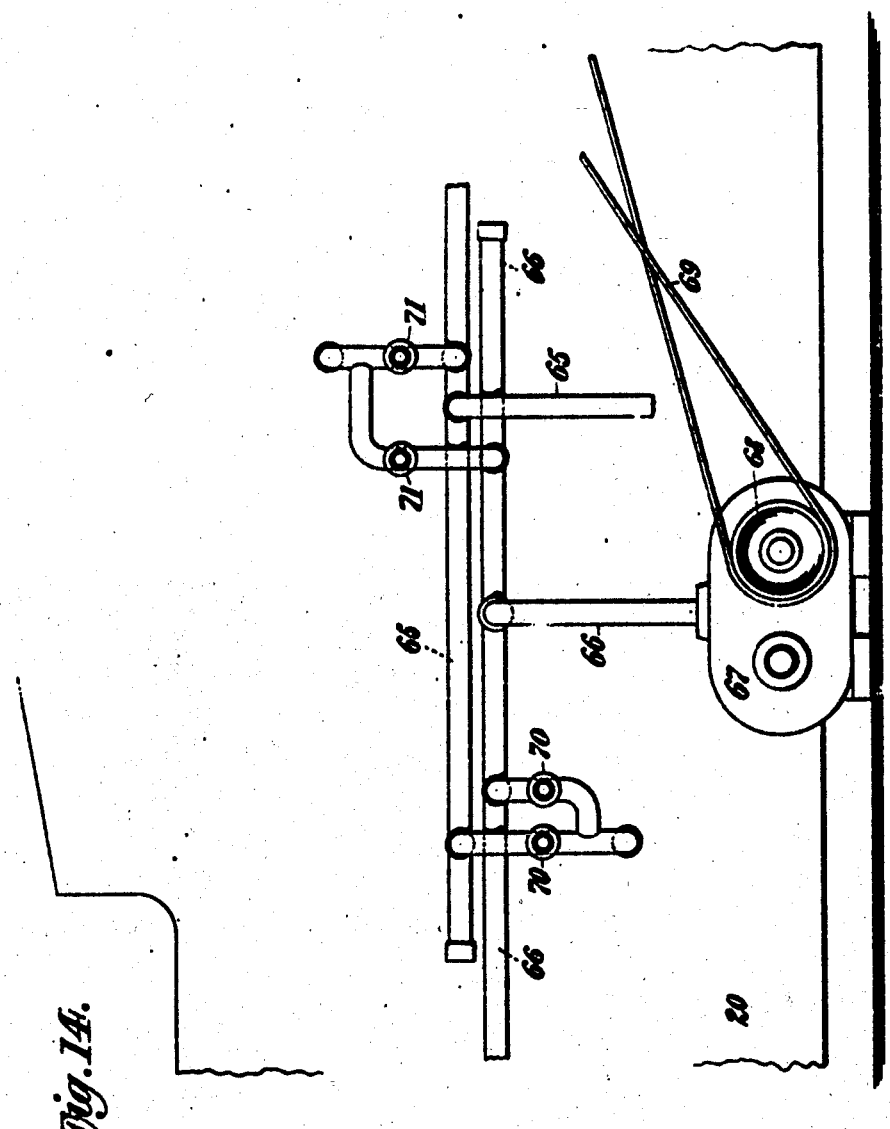

In the accompanying drawings forming part of this specification, wherein like numerals of reference indicate like parts, Figures 1 and 2, jointly constitute substantially a complete side view, partly broken and in section, on line 1—1 of Fig. 3 illustrating a type of machine constructed according to and embodying my invention; Fig. 3 is a transverse section taken on the line 3—3 of Fig. 1 looking in the direction of the arrow *a;* Fig. 4 is an enlarged detail longitudinal section on the line 4—4 of Fig. 6 showing the arrangement and construction of a number of tongs or plates, and the locking mechanism therefor; Fig. 5 is an enlarged detail transverse section of the same, taken on the line 5—5 of Fig. 6; Fig. 6 is a plan view of the construction shown in section at Fig. 4; Fig. 7 is an enlarged detail plan view showing an upper hinged tong or plate, the locking mechanism therefor, and related parts coöperating therewith; looking in the direction of the arrow *b* Fig. 1; Fig. 8 is a detail section taken on the line 8—8 of Fig. 7, showing the tong or plate inverted, and as seen looking in the direction of the arrow Fig. 1; Fig. 9 is an enlarged detail side view, partly broken away, showing a batter receptacle, and the pump for transferring the same to the distributing nozzles; Fig. 10 is an enlarged detail sectional view showing the construction of the valves or nozzles for spraying the batter, said section being taken on the line 10—10 of Fig. 11; Fig. 11 is a section of the same taken on the line 11—11 of Fig. 10. Figs. 12 and 13 are detail perspective views showing respectively the construction of the upper and lower plates of the tongs detached from their supports, and Fig. 14 is a side view of a portion of the machine, showing the arrangement of the gas and air pipes and mixing apparatus therefor.

In said drawings 20 designates a frame having its right-hand portion (see Fig. 2) inclosed by a housing 21 provided with a stack or flue 21ª, and at the extreme right-hand end of said frame, outside of the housing, is mounted a transverse driving shaft 22 having fast and loose pulleys 23, 24 respectively thereon at one end, and a gear 25 at its opposite end meshing with a large gear 26 fixed upon a transverse shaft 27 supported below the driving shaft 22. Also fixed upon said shaft 27 is a small gear 28 meshing with a large gear 29 fixed upon a transverse shaft 30 mounted in the frame 20 within the housing 21.

31, 31 denote sprocket wheels fixed upon the shaft 30.

Supported upon studs 32, 32 extending inwardly from the frame 20 are longitudinal roller guides or rails 33, 33, 34, 34. The lower rails 34 34 are straight and the upper rails 33 33 are arranged above the same and parallel therewith, but have their opposite ends rounded, as shown at Figs. 1 and 2, and their extremities adjacent to and slightly above the ends of said lower rails 34 34.

35 35 denote a series of tongs or plates having their adjacent transverse edges substantially in contact and conjointly forming a continuous, uninterrupted trough-shaped support for the batter. Each of said tongs or plates comprises a base 36 provided at its under side with axles 37 37 having rollers 39 39 arranged upon their outer ends adapted to ride upon the rails or guides 33, 34 as the tongs or plates 35 are caused to travel over the same by the engagement of the teeth of the sprocket wheels 31, 31 with the projecting ends of the axles 37 37 of the bases 36 36. Upon the base 36 is secured by means of screws 40, 40 a plate 41 provided along its longitudinal edges with upwardly projecting rims 42 42 which are sharp at their upper edges and beveled downwardly and inwardly therefrom as illustrated at Figs. 5 and 13.

43 43 denote links which are pivotally secured at their ends to the projecting ends of the shafts 37 37 at the opposing ends of the tongs or plates 35, 35 and serve to hold said ends in close contact as the same travel upon the horizontal portions of the rails or guides 34, 34.

44, 44 denote the cover portions of the tongs or plates 35, 35 which are provided along one of their longitudinal edges with outwardly and downwardly projecting hinge members 45, 45 which are pivotally secured to the upwardly projecting hinge members 46, 46 of the axles 37 37 by pins 47 47. Upon the under side of the cover portion 44 is secured by screws 48 48 a plate 49 having a sharp downwardly projecting rim 50 (similar to the rims 42, 42 of the lower plates 41) at its forward end in relation to the direction of travel of said tongs or plates 35 (see Fig. 12).

At the center of the opposite longitudinal edge of each tong or plate 35 is provided a locking device for holding the cover portion 44 locked to the base 36. Said device consisting of a vertical sleeve or bearing 51 secured to the base 36 in which sleeve or bearing is disposed a shaft 52 having a four-toothed gear or star wheel 53 at its lower end adapted to extend through a slot in a lateral projection 55 extending outward from the edge of the cover portion 44. 56 denotes an antifriction roller arranged upon the outer end of the lateral projection 55.

Upon the inner side of one of the upper guides or rails 33, are provided inwardly projecting studs 57, 58. The former 57 being disposed at the rounded portion of the guide or rail 33 at the left-hand end of the machine and serves to unlock the cover portions 44, and the latter 58 in the horizontal portion of said guide or rail adjacent to the entrance end of the housing 21, and serves to lock said cover portions 44 to their bases 36.

At one side of the machine are secured double cam guide-rails 59, 59 which extend from the left-hand end of the machine upward and transversely across the same and thence downward and outward and terminate in parallel ends adjacent to the entrance end of the housing 21. Said cam guide-rails being adapted to receive intermediate the same the rollers 56, of the cover portions 44 of the tongs or plates 35 in order to open them after having been unlocked to receive the batter, and thence close said cover portions 44 again prior to their being locked to their bases as the tongs pass into the housing 21.

Both the cover portions 44 and the bases 36 are provided along their longitudinal edges with angle iron sections 60, 60 having their vertical faces in alinement with the correspondingly located sections of the remaining base and cover portions and flush with the edges thereof.

Within the housing 21 between the upper and lower rails or guides 33, 33 and 34 are supported upon brackets longitudinal troughs 61, 61 62, 62, which constitute ovens. The troughs 61, 61 being arranged above and below the series of tongs or plates traveling upon the upper rails 33, 33, and the troughs 62 62 being arranged above and below the series of tongs or plates traveling upon the rails 34, 34 and said troughs are so arranged that their longitudinal edges shall be close to and overlap the edges of the angle iron sections 60, 60 of the tongs 35 as the same pass through said housing 21.

63 63 denote gas burners which are disposed transversely at intervals within the troughs 61, 62, and connected by means of branch pipes 64, 64 to a gas supply pipe 65, and an air supply pipe 66 connected to a mixer 67 operated by a pulley 68 and belt 69 passing over the same and the pulley 23 on the driving shaft 22 of the machine.

70 and 71 denote respectively valves arranged in the air and gas supply pipes 65, 66 for controlling the supply of mixed fluid to the burners 63, 63.

Upon the left-hand side of the machine (Fig. 3) is arranged batter supplying mechanism comprising a batter receptacle 72 which is supported upon brackets 73 secured to the frame 20. Above said receptacle is secured a rotary pump 74 having a depending intake pipe 75 extending into the batter receptacle 72 and a discharge 76 extending inwardly into the machine and terminating in a flattened portion 77 disposed transversely in the path of the tongs 35 and above the bases 36 thereof. 78, 78 denote spraying valves arranged in the flattened portion 77 of said discharge pipe 76. Said valves each comprising a cylindrical casing 79 having an annular projection or lip 80 at its lower end, and a valve 81 having an inclined face 82 conformed to said projection or lip 80. Said valve 81 having a screw threaded stem 83 provided with a head 84 working thereon which also serves to seal the upper end of the casing 79.

85 denotes an annular recess provided in the portion of the head 84 within the casing 79 adapted to receive a screw 86 extending through the side of the casing and serving to hold said head 84 against vertical movement in said casing, and 87 denotes a screw extending through said casing and into a vertical recess 38 in the rear surface of the valve 81 which serves to lock said valve against rotary movement within said casing 79 but permit of a given vertical movement.

The discharge pipe 76 is provided with a by-pass valve 88 and a return pipe 89 extending into the batter receptacle 72 to permit of the return of batter to said receptacle in case certain of the spraying valves 78, 78 are closed, or the pump 74 should lift more batter than the discharge pipe can handle.

The pump 74 is actuated by means of a shaft 89ª having its outer end supported in a bearing 90 secured to the frame 20, and a pulley 91 fixed upon the outer end of said shaft 89, driven by a belt 92 connected to a convenient source of power.

The operation of the machine is as follows: Assuming that power is to be communicated to the drive shaft 22 it will transmit movement to the sprocket wheels 31 through the intermediate gears 25, 26, 28 and 29 and cause the tongs 35, 35 to travel in the direction of the arrows a, a Figs. 1 and 2. The cover portions 44 of the tongs 35 will be locked to the bases 36 throughout the greater part of their movement. They will only be unlocked as the star wheels 53 contact with the stud 57 as the tongs ride over the rounded ends of the guide rails 33, 33 at the left-hand end of the machine just prior to the entry of the rollers 56 of the cover portions 44 between the cam-guides 59, 59 which serve to open the covers and maintain the same so to receive the batter spread thereon by means of the pump 74 and spraying nozzles 78, 78 which distribute the batter in fan-shaped sprays, as shown at Fig. 11. It is to be noted that the lower plates 41, as they pass over the upper guide rails 33, 33 form a continuous, uninterrupted trough-shaped support for the reception of the batter, and that the longitudinal rims 42, 42 prevent the batter overflowing the edges of said plates 41, while the rims 50 of the upper plates 49 will serve to retain the batter at the forward edge of the plates, and cause the same to be properly severed as the tongs pass over the sprocket wheels 31, 31 an after having passed through the upper trough or ovens 61, 61. The transverse rims 50 at the forward edge of the upper plates 49 further serve to push rearward to the succeeding plates any excess of batter between said upper and lower plates as the same become locked together. After having passed through the upper trough or ovens, 61 61, the tongs or plates 35 become inverted, and thence pass through the lower troughs or ovens 62, 62, where the baking operation is continued further. As the tongs 35 again approach the left-hand end of the machine the covers 44 are unlocked by the contact of the star wheels 53 with the stud 57 and permit of the removal of the baked wafer sheet. The operation above described being continuous.

It will be noted that in my improved machine as the tongs or plates present a continuous, uninterrupted support for the batter the spraying or discharging of batter may also be continuous, and by this means I am enabled to obviate all necessity for complicated mechanism for timing or delivering the batter to the tongs in measured doses or charges, which is always attended with a considerable waste of material.

Having thus described my invention, what I claim and desire to secure by Letters Patent is:

1. A machine of the character described comprising a continuous series of traveling tongs or plates forming a continuous, uninterrupted trough-shaped batter support, and means for supplying batter thereto, substantially as specified.

2. A machine of the character described, comprising a continuous series of traveling tongs or plates having their ends substantially in contact and forming a continuous, uninterrupted trough-shaped batter support, and means for supplying batter thereto, substantially as specified.

3. A machine of the character described, comprising a continuous series of traveling tongs or plates having their transverse edges substantially in contact, and forming a continuous, uninterrupted trough-shaped batter support, and means for supplying batter thereto, substantially as specified.

4. A machine of the character described, comprising a series of connected traveling tongs or plates having their transverse abutting edges substantially in contact and forming a continuous, uninterrupted trough-shaped batter support, and means for uninterruptedly supplying batter to said support, substantially as specified.

5. A machine of the character described comprising a series of connected, traveling tongs or plates having rims along their opposite longitudinal edges and their opposing transverse edges substantially in contact and forming a continuous, uninterrupted trough-shaped batter support, and means for uninterruptedly supplying batter to said support, substantially as specified.

6. A machine of the character described, comprising a series of connected, traveling tongs or plates forming a continuous, uninterrupted trough-shaped batter support a series of covers for said trough-shaped batter support, means for successively uncovering a portion of said trough-shaped batter support, and means for uninterruptedly supplying batter to the uncovered portion of said trough-shaped batter, support, substantially as specified.

7. A machine of the character described, comprising a series of connected, traveling tongs or plates having upwardly-projecting rims along their opposite longitudinal edges, and their adjoining transverse edges substantially in contact and forming a continuous, uninterrupted trough-shaped batter support, covers for said tongs or plates, means for uncovering said tongs or plates, and means for uninterruptedly supplying batter to the uncovered portions of said trough-shaped batter support, substantially as specified.

8. A machine of the character described, comprising a continuous traveling batter support consisting of a plurality of contacting connected tongs or plates, and means for simultaneously spraying said batter support transversely for its entire width as the same passes below said spraying means, substantially as specified.

9. A machine of the character described, comprising a continuous traveling batter support consisting of a plurality of contacting connected tongs or plates, and means for uninterruptedly supplying batter to said support and simultaneously spraying the same thereon transversely for its entire width as said support passes below said spraying means, substantially as specified.

10. A machine of the character described, comprising a traveling batter support consisting of a plurality of connected tongs or plates having the opposing edges substantially in contact, rims along the longitudinal edges of said tongs or plates, and covers for said tongs or plates each having a rim along one of its transverse edges, substantially as specified.

11. A machine of the character described, comprising a traveling batter support consisting of a plurality of connected tongs or plates having the opposing edges substantially in contact, rims along the longitudinal edges of said tongs or plates, covers for said tongs or plates, each having a rim along one of its transverse edges, and means for supplying batter to said support in the form of a continuous spray or stream, substantially as specified.

12. A machine of the character described, comprising a traveling batter support consisting of a plurality of connected tongs or plates having their transverse edges substantially in contact, hinged covers for said tongs or plates, means for opening and closing said covers, and batter spraying means arranged in the path of said tongs or plates for uninterruptedly supplying batter to said plates as the same are uncovered in their movement, substantially as specified.

13. A machine of the character described, comprising a traveling batter support consisting of a plurality of connected tongs or plates having their transverse edges substantially in contact, hinged covers therefor, means for supplying batter to said tongs or plates comprising a delivery pipe extending transversely in the path of said tongs or plates spraying devices arranged in said delivery pipe, and means for conveying batter to said spraying devices, substantially as specified.

14. A machine of the character described comprising a traveling batter support consisting of a plurality of connected tongs or plates having their transverse edges substantially in contact, hinged covers for said tongs or plates, a pipe communicating at one end with a source of batter supply, and having its other end extending transversely in the path of said tongs or plates, and a plurality of spraying devices arranged in said end provided with means for controlling the delivery of batter to said traveling support, substantially as specified.

15. In a machine of the character described, a batter tong or plate comprising a base-member having upwardly projecting rims along its longitudinal edges, and a cover-member hinged to said base-member having a depending rim along one of its transverse edges, extending intermediate the longitudinal rims on said base member, substantially as specified.

16. In a machine of the character described, a batter tong or plate comprising a base-member having sharp upwardly projecting rims along its longitudinal edges, and a cover-member pivotally secured to said base-member having a sharp depending rim along one of its transverse edges adapted to lie intermediate the longitudinal rims of said base-member, substantially as specified.

17. In a machine of the character described, a batter tong or plate comprising a base-member having sharp upwardly projecting rims along its longitudinal edges, a cover-member pivotally secured to said base-member having a sharp depending rim along one of its transverse edges adapted to lie intermediate the longitudinal rims of said base-member, and a locking device for securing said base and cover members together, substantially as specified.

18. In a machine of the character described, a batter tong or plate comprising a base, a plate thereon having upwardly projecting rims along its opposite longitudinal edges, and a cover hinged to said base having a plate secured thereon provided along the of its transverse edges with a depending rim adapted to contact with the surface of said base-member, substantially as specified.

19. In a machine of the character described, a batter tong or plate comprising a base, a plate secured thereon having sharp, upwardly projecting rims along its longitudinal edges, and a cover hinged to said base having a plate secured upon the underside thereof provided with a sharp depending rim along one of its transverse edges adapted to contact with the plate on said base, intermediate its longitudinal rims, substantially as specified.

20. In a machine of the character described, the combination with a series of traveling batter tongs or plates, of troughs arranged above and below said tongs or plates provided with longitudinal openings to receive said tongs or plates, and heating means arranged in said troughs, substantially as specified.

21. In a machine of the character described, the combination with a series of traveling batter tongs or plates, of longitudinal troughs arranged above and below said batter tongs or plates, provided in their opposing sides with longitudinal openings above and below said tongs or plates to receive the same, and heating means arranged in said troughs, substantially as specified.

22. In a machine of the character described, the combination with a series of connected batter tongs or plates having vertical projecting rims along their longitudinal edges, of troughs arranged above and below said tongs or plates having longitudinal openings therein, and the edges of said troughs overlapping the longitudinal edges of the rims on said tongs or plates, substantially as specified.

23. In a machine of the character described, the combination with a series of batter tongs or plates having vertical projecting rims arranged along the longitudinal edges of their base and cover portions, of open longitudinal troughs arranged above and below said tongs or plates having their opposing edges overlapping the rims on said tongs or plates, and heating means arranged in said troughs above and below said tongs and plates, substantially as specified.

24. In a machine of the character described, a batter tong or plate comprising a base, a plate secured thereon having sharp, upwardly projecting rims along its longitudinal edges, a cover hinged to said base having a plate secured upon the underside thereof provided with a sharp depending rim along one of its transverse edges, and a locking device for securing said base and cover together, substantially as specified.

25. In a machine of the character described, a spraying device comprising a casing having a downwardly inclined lip at its base, a valve arranged in said casing having a face conforming to said lip, a stem on said valve, and a revoluble head closing the upper end of said casing and engaging the valve stem therein, substantially as specified.

26. In a machine of the character described, a spraying device comprising a cylindrical casing having a downwardly inclined lip at its base, a valve arranged in said casing having an inclined face, a threaded stem on said valve, a revoluble head closing the upper end of said casing and engaging said threaded valve stem, means for revolubly holding said head in said casing, and means for holding said valve against rotary movement in said casing, substantially as specified.

27. In a machine of the character described, a spraying device comprising a cylindrical casing having a downwardly inclined projecting lip at its base, a vertically movable valve arranged in said casing having an inclined face conforming to said lip, a threaded stem on said valve, a revoluble head closing the upper end of said casing and engaging said threaded valve stem, an annular recess in said head, a screw extending through said valve casing and into said annular recess, a vertical recess in said valve, and a screw extending through said casing and into said vertical recess, substantially as specified.

Signed at the city of New York, in the county and State of New York, this eleventh day of May, nineteen hundred and five.

FRANK M. PETERS.

Witnesses:
H. H. HUNGERFORD,
CONRAD A. DIETERICH.